(12) United States Patent
Goldberg

(10) Patent No.: US 6,606,624 B1
(45) Date of Patent: Aug. 12, 2003

(54) APPARATUS AND METHOD FOR RECOMMENDING TO AN INDIVIDUAL SELECTIVE INFORMATION CONTAINED WITHIN A COMPUTER NETWORK

(75) Inventor: Kenneth Y. Goldberg, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/467,447

(22) Filed: Dec. 20, 1999

Related U.S. Application Data

(60) Provisional application No. 60/148,839, filed on Aug. 13, 1999.

(51) Int. Cl.[7] .............................. G06F 17/00; G06N 5/00
(52) U.S. Cl. ............................................. 707/6; 706/45
(58) Field of Search .............................. 707/10–12, 3, 707/5, 6; 709/200–219; 706/45–56, 16–18, 25–26; 704/256; 382/211–219; 395/2.12–2.66; 705/27

(56) References Cited

U.S. PATENT DOCUMENTS

| | | | |
|---|---|---|---|
| 4,870,579 A | 9/1989 | Hey | 364/419 |
| 4,996,642 A | 2/1991 | Hey | 364/419 |
| 5,506,933 A * | 4/1996 | Nitta | 704/256 |
| 5,793,888 A * | 8/1998 | Delanoy | 382/219 |
| 5,842,194 A * | 11/1998 | Arbuckle | 706/52 |
| 5,884,282 A | 3/1999 | Robinson | 705/27 |
| 5,884,305 A | 3/1999 | Kleinberg et al. | 707/6 |
| 5,918,014 A * | 6/1999 | Robinson | 709/219 |
| 5,950,189 A | 9/1999 | Cohen et al. | 707/3 |
| 6,134,537 A * | 10/2000 | Pao et al. | 706/16 |
| 6,202,058 B1 * | 3/2001 | Rose et al. | 706/45 |

* cited by examiner

Primary Examiner—Safet Metjahic
Assistant Examiner—Te Yu Chen
(74) Attorney, Agent, or Firm—Dorsey & Whitney LLP

(57) ABSTRACT

The method of the invention is executed by a computer under the control of a program stored in computer memory. The method includes the step of accumulating preference data for a set of individuals. The preference data is transformed from multi-dimensional data to lower-dimensional data using a principal component analysis. The lower-dimensional data is then converted into a recommendation map where predicted preference information for a selected individual is easily computed. Recommended content is then routed to the selected individual. The invention has been tested, by way of example, to recommend jokes to users based on their ratings of sample jokes.

21 Claims, 5 Drawing Sheets

APPARATUS AND METHOD FOR RECOMMENDING TO AN INDIVIDUAL SELECTIVE INFORMATION CONTAINED WITHIN A COMPUTER NETWORK

This application claims priority to the provisional patent application entitled: "Apparatus and Method for Recommending to an Individual Selective Information Contained within a Computer Network," Ser. No. 60/148,839, filed Aug. 13, 1999.

This invention was made with Government support under Grant (Contract) No. IRI-9553197 awarded by the National Science Foundation. The Government has certain rights to this invention.

BRIEF DESCRIPTION OF THE INVENTION

This invention relates generally to techniques for providing to individuals in a computer network environment information that is of interest to them. More particularly, this invention relates to a technique using a numerical method (a principal component analysis) to recommend to an individual selective information, such as, books, movies, stocks, or toys, available within a computer network.

BACKGROUND OF THE INVENTION

The World Wide Web and other computer networked infrastructure is a repository of vast amounts of data. As such, users face an arduous task of retrieving information which matches their requirements and preferences. Collaborative filtering technology provides an automated approach for retrieval of preference-based content in this networked environment.

The term "collaborative filtering" refers to a process in which individuals cooperate with one another to screen information by recording the reactions of individuals to material they review. This process is sometimes referred to as a "recommender system".

With content personalization becoming an essential component of many web-based consumer services and the number of Internet users growing daily, there is a demand for efficient collaborative filtering algorithms. A variety of methods have been applied to domains such as newsgroup postings, books, music, movies and web sites. Different domains have different properties, which motivate variations in methodology. What these systems have in common is the ability to record from many users numerical approval ratings for a domain of objects.

A new user enters the system and provides new ratings for an object set. These ratings are used to find a similar set of users. Ratings from that set of users are then used to predict the ratings that the new user will give to objects not yet considered.

A collaborative filtering system should be: (1) effective, such that recommended objects receive high ratings; and (2) efficient, such that recommendations can be generated quickly.

Collaborative filtering is particularly effective on the World Wide Web, where a large corpus of users is available. But very large numbers of users introduces computational challenges.

In view of the foregoing, it would be highly desirable to provide a collaborative filtering technique with improved efficiency.

SUMMARY OF THE INVENTION

The method of the invention is executed by a computer under the control of a program stored in computer memory. The method includes the step of accumulating preference data for a set of individuals. The preference data is transformed from multi-dimensional data to lower-dimensional data using a principal component analysis. The lower-dimensional data is then converted into a recommendation map, which provides a hierarchy of values for content based upon previous ratings of the content. Preference information for a selected individual is then collected. The preference information is then mapped to the recommendation map. Content from a set of deliverable content is then routed to the selected individual.

The apparatus of the invention is a computer readable memory to direct a computer to function in a specified manner. The computer readable memory includes executable instructions forming a preference accumulation module to accumulate preference data for a set of individuals. A set of executable instructions forms a mapping module including a principal component analysis module to transform the preference data from multi-dimensional data to lower-dimensional data using a principal component analysis. A clustering module converts the lower-dimensional data into a recommendation map. The recommendation module coordinates preference information for a selected individual and maps the preference information to the recommendation map. The computer readable memory also includes a content delivery module to route to the selected individual chosen content from a set of deliverable content.

The invention utilizes a novel principal component analysis (PCA) and clustering-based collaborative filtering technique for efficient and effective personalized information retrieval. The invention avoids semantic categories by relying solely upon numerical ratings, such that each content block and each user is treated as a "black box" to which statistical pattern recognition techniques are applied. Using this approach, the technique of the invention is applicable to different domains of objects without customization for each domain. Thus, the technique is readily used for recommending diverse content, such as books, movies, toys, stocks, and music.

Preferably, the invention splits the prediction process into an off-line and an on-line component. The following computations are performed off-line: the correlation matrix between users, the principal component analysis, clustering, the prediction vectors for each cluster, and the formation of a recommendation map. This is performed in an $O(kn^2)$ time order, where O refers to order complexity, which is a standard measure of computational efficiency in computer science, where n is the number of users in the database and k is the number of objections in the prediction set. Whereas in traditional prior art collaborative filtering methods, processing time scales as $n^2$, advantageously the present invention breaks computation into off-line and on-line phases such that on-line processing time is constant, i.e., is independent of the number of users n in a database. Advantageously, off-line computation of principal component analysis, clustering, and formation of a recommendation map permits the on-line computation to be especially efficient and, as noted, independent of the number of users n. The recommendation map is used on-line to identify objects to recommend. This on-line process is achieved in a $O(k)$ time order. As k is a constant, an $O(k)$ time order is simply the computer theory equivalent statement to saying that processing time is independent of n, i.e., processing time is independent of the number of users in a database. As noted above, this feature of the present invention advantageously facilitates rapid computation of recommendations.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
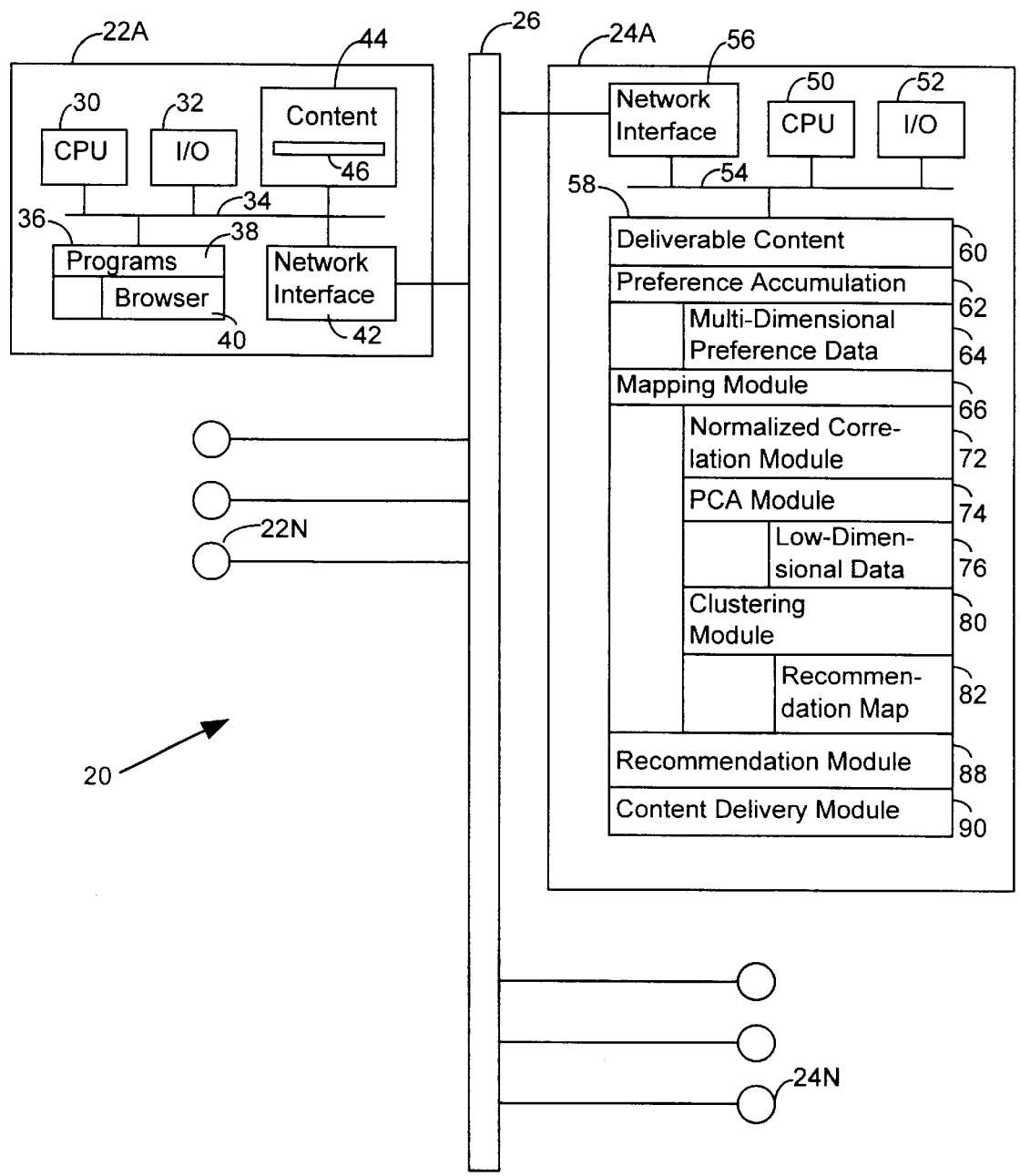
FIG. 1 illustrates a networked computer environment in which the invention operates.

FIG. 1 illustrates a networked computer environment 20 implementing the technique of the invention. The networked computer environment 20 includes a set of client computers 22A–22N in communication with one or more server computers 24A–24N via a transmission channel 26. The transmission channel 26 may be any wire or wireless transmission channel.

Each client computer 22 is a standard computer, including a central processing unit 30, which communicates with a set of input/output devices 32 over a system bus 34. The input/output devices 32 may include standard components, such as a keyboard, mouse, computer monitor, printer, and the like. A memory (primary and/or secondary memory) 36 is also connected to the system bus 34. The memory 36 stores a set of executable programs 38, which include a web browser 40. A network interface circuit 42 is also connected to the system bus 34. The network interface circuit 42 establishes standard network communications for the computer 22. The computer 22 also includes a graphical user interface 44. Informational content is delivered to the graphical user interface 44. The informational content may be text, graphics, video, sound, and the like. A fine-grained rating menu 46 is also provided by the graphical user interface 44. As discussed below, the fine-grained rating menu 46 allows a user of the computer 22 to provide preference data along a fine-grained scale, as opposed to being limited to integer preference values.

FIG. 1 also illustrates a server computer 24. The server computer 24 includes standard server components, such as a central processing unit 50, which communicates with a set of input/output devices 52 over a system bus 54. The server computer 24 also includes a network interface circuit 56 to establish standard networked communications. A memory (primary and/or secondary memory) 58 is also connected to the system bus 54. The central processing unit 50, input/output devices 52, system bus 54, network interface circuit 56, and memory 58 constitute standard server computer components. The invention is not directed toward these standard components, rather the invention is directed toward the executable programs stored in the memory 58. The executable programs may be distributed over different client and server computers, but for the sake of simplicity, the invention is disclosed in connection with a single memory 58 storing the executable programs.

The executable programs stored in memory 58 include deliverable content 60. The deliverable content 60 may be any information that can be routed in a networked environment. Thus, the deliverable content 60 includes text, images, sound, and the like. By way of example, the invention is disclosed in the context of delivering jokes. As discussed below, a user is asked to rank a set of jokes. The users preferences are then mapped to a recommendation map. Thereafter, jokes can be delivered to the user based upon established preferences. Although the invention is disclosed in connection with jokes, those skilled in the art will appreciate that the invention is applicable to any type of content, including music, books, gifts, records, advertisements, and the like.

The memory 58 also stores a preference accumulation module 62. The preference accumulation module 62 constitutes a set of executable code to secure preference information from a user in the computer network environment 20. The preference accumulation module collects a set of multi-dimensional preference data. As used herein, the term "multi-dimensional" refers to three or more dimensions. In the example provided below, the multi-dimensional preference data has ten dimensions.

A mapping module 66 is also stored in the memory 58. The mapping module 66 is a set of executable code that operates to produce a recommendation map 82. The exemplary disclosed embodiment of the mapping module 66 includes a normalized correlation module 72. The normalized correlation module 72 calculates covariances between ratings for each individual user and generates a global correlation matrix over all users, as discussed below.

The memory 58 also includes a principal component analysis (PCA) module 74. The PCA module 74 is a set of executable instructions that transform the multi-dimensional preference data 64 to lower-dimensional data 76. As used herein, the term lower-dimensional data refers to data that has a lower dimension than the multi-dimensional preference data 64. In the example provided below, the lower-dimensional data is two-dimensional data.

The principal component analysis technique utilized in accordance with the invention uses the principal Eigen vectors of a correlation matrix to optimally reduce the dimensionality of a data set while preserving as much variance as possible. The lower-dimensional data 76 is easier to analyze than the multi-dimensional data 64. One of the benefits of the invention is the ability to operate on the lower-dimensional data 76, while preserving the rich content from the multi-dimensional data 64.

Once the lower-dimensional data 76 is formed, subsequent processing modules are used to process it. In particular, the clustering module 80 is used to cluster the lower-dimensional data 76. The clustering module 80 includes executable code to implement a standard clustering method, such as rectangular subdivision clustering. The preference values within each cluster are then averaged to predict the preference values for an average member of the clusters.

These predicted preference values are then sorted to produce a recommendation map 82 for each cluster: a recommendation map is an ordered list of recommended objects from highest to lowest in terms of predicted preference value. A recommendation map 82 is stored for each cluster of users.

The recommendation map 82 is subsequently utilized by a recommendation module 88 to provide suitable recommendations for a user lying in any of the clusters. In particular, when a user enters the system, the recommendation module 88 multiplies the users preference values for the objects in the prediction set by the Eigen vectors to produce a lower-dimensional data point. The recommendation module 88 then uses standard classification to find the most appropriate cluster for this user and the corresponding recommendation map 82 is then retrieved from memory 58 so that appropriate objects can be recommended to the user.

The content delivery module 90 includes a set of executable instructions to route recommended content to a user. In particular, the content delivery module 90 routes objects (content) from the recommendation set to the new user in order of predicted preference and the user is asked to rate the new objects presented. The recommended content is delivered over the transmission channel 26 using standard computer network data delivery techniques.

The executable modules associated with the mapping module 66 are computationally intensive. Preferably, these modules are executed in an off-line mode. As used herein, the term "off-line" refers to a process that is performed during a non-interactive computer session. The ability to execute the mapping module 66 in an off-line mode means that the invention can operate quickly in an on-line mode. The term "on-line" refers to a dynamic, interactive computer session in which an individual expects to receive data without an unreasonable delay. Preferably, the preference accumulation module 62, the recommendation module 88, and the content delivery module 90 operate in an on-line manner.

Figure 2:
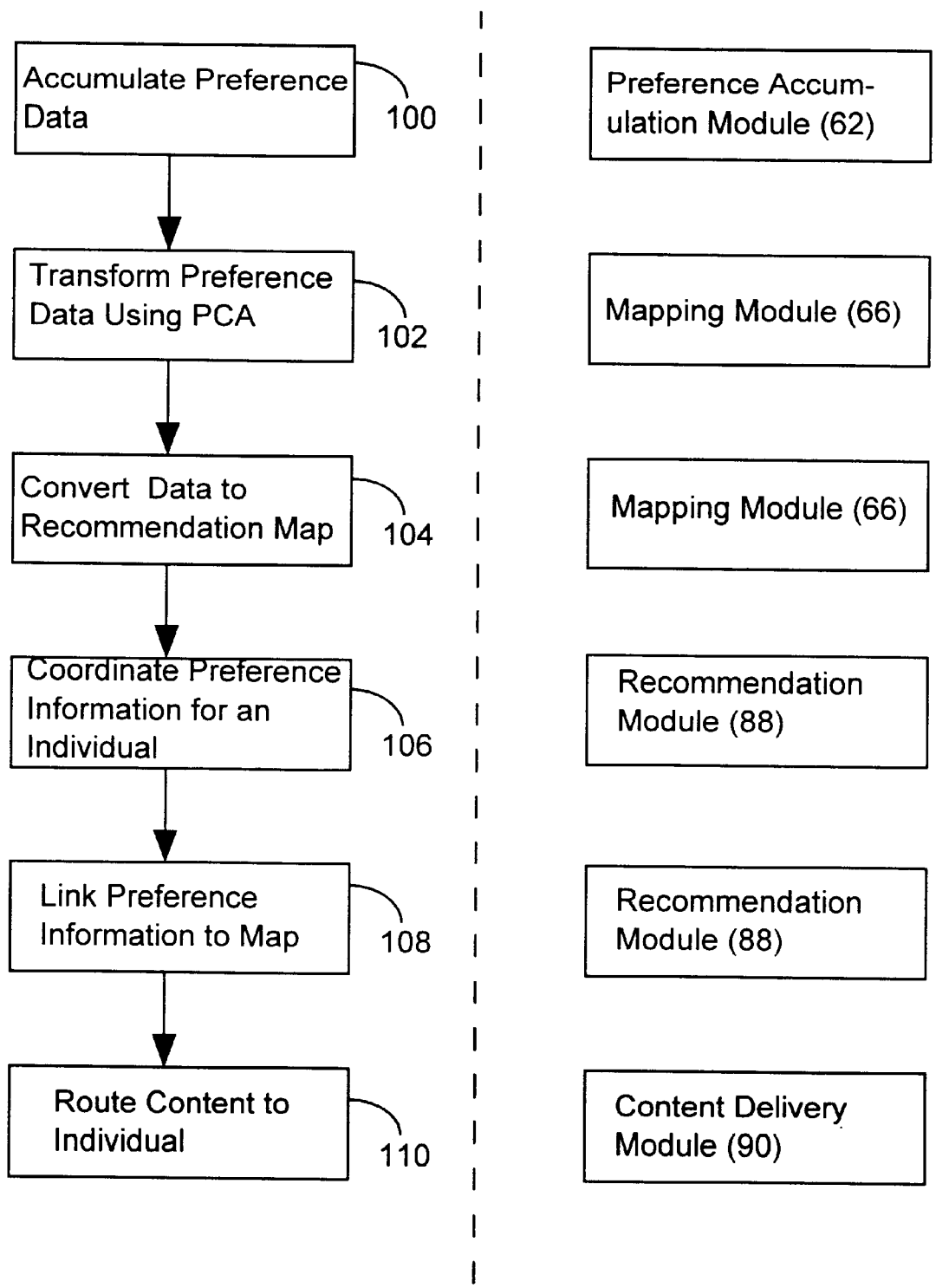
FIG. 2 illustrates processing steps performed in accordance with an embodiment of the invention.

The processing performed in accordance with the invention is more fully appreciated with reference to FIG. 2. The left side of FIG. 2 illustrates processing steps performed in accordance with the invention, while the right side of the figure illustrates executable modules that may be used to implement the processing.

The first processing step shown in FIG. 2 is to accumulate preference data for a set of individuals (step 100). This operation is performed by the preference accumulation module 62. Next, the preference data is transformed from multi-dimensional data to lower-dimensional data using a principal component analysis (step 102). This operation is performed by the mapping module 66. The lower-dimensional data is then converted into a recommendation map (step 104). This operation is also performed by the mapping module 66.

Next, preference information for an individual is coordinated (step 106). By way of example, this may be performed with the recommendation module 88 in an interactive on-line session between a server computer and a client computer. The preference information for the individual is then linked to the recommendation map (step 108). This step is also performed by the recommendation module 88. Finally, content is routed to the individual (step 110). By way of example, the content delivery module 90 may be used to route the content from a server computer to a client computer.

Those skilled in the art will recognize a number of inventive features associated with the system 20. First, the disclosed technique utilizes a principal component analysis to facilitate a process for recommending information. This principal component analysis is based upon fine-grained rating information as secured from the fine-grained rating menu 46. The utilization of a principal component analysis results in a collaborative filtering system that is fundamentally different than prior art systems. Prior art collaborative filtering systems process enormous data sets, resulting in sparse matrices. In contrast, the invention utilizes a relatively small number of preference information for each individual, typically less than twenty. This results in dense matrices during the prediction process, in contrast to large, sparse matrices associated with prior art prediction processes.

Another advantage associated with the invention is the ability to perform computationally intensive tasks in an off-line mode, thereby allowing on-line interactions to be relatively fast and thus highly efficient.

The computational components and benefits of the invention have been described. These components and benefits are more fully appreciated with the following, more detailed discussion of the invention.

As previously indicated, the invention is disclosed in the context of jokes, solely by way of example. The techniques of the invention are equally applicable to recommending other types of content. Thus, the following discussion in the context of jokes should not limit the scope of the invention.

Consider now that the deliverable content 60 is a set of jokes. The preference accumulation module 62 delivers to a user at a client computer 22 a set of jokes for ranking. In particular, after successfully registering a user, the preference accumulation module 62 presents a user with jokes in the predictor set (e.g., a set of 10 jokes) and five random jokes, one-by-one. Each joke frame has a joke in the top half and a fine-grained rating bar 46 at the bottom of the screen, implemented with the image map control provided in Hyper Text Markup Language (HTML). The fine-grained rating bar 46 allows preference values to be entered at a resolution of the pixel value of the computer monitor being used. Thus, the fine-grained rating bar 46 provides high resolution preference data, in contrast to prior art techniques in which a small number of integer values are used to derive preference data.

Each click upon the fine-grained rating bar 46 produces a fine-grained value. The fine-grained value may be converted to real-valued ratings (e.g., between −10 and 10). Clicking upon the fine-grained rating bar 46 also leads to the next joke being presented by the preference accumulation module 62. After all jokes in the predictor set have been rated, the ratings are processed by the mapping module 66 to characterize the user's sense of humor. The recommendation module 88 then generates the list of jokes to be recommended to the user. The content delivery module 90 subsequently presents them to the user.

The preference accumulation module 62 has been implemented to establish communication with the graphical user interface 44 using the CGI protocol. The C code coupled with an efficient prediction algorithm results in a relatively good system performance. Page content has been kept low in graphic content to allow fast downloads even from slow Internet connections. The system itself runs of an Apache 1.3.0 http server running on a dual Pentium II machine.

Joke ratings were initially collected in the following manner. The system generated a password at random from a dictionary and emailed it to each user, along with a user-id. Initially, a set of 40 brief jokes was selected. Approximately 80 participants were then asked to rate all jokes by visiting the website at server 24A. These users formed the alpha set A. To identify a reasonable "predictor set", $J_p$, of jokes, the means and variances for each joke was computed. The 10 jokes with the highest variance were then placed in the predictor set. Thereafter, users rate these 10 jokes and 5 jokes selected at random from the recommendation set. They are then recommended jokes based on the method described below.

In accordance with the invention, off-line data analysis is performed to cluster users with similar tastes and to determine a better prediction criteria. Since clustering in high dimensions requires extensive computation, the invention utilizes a principle component analysis. The technique of the invention considers correlations between each pair of jokes in the predictor set and finds the Eigen vectors of the correlation matrix. The technique then uses the principal Eigen vectors to project the ten-dimensional ratings into a lower-dimensional space.

The covariances between joke ratings can be calculated for each individual user, allowing the construction of the global correlation matrix C over all the users. This operation is performed with the executable instructions of the normalized correlation module 72.

Figure 3:
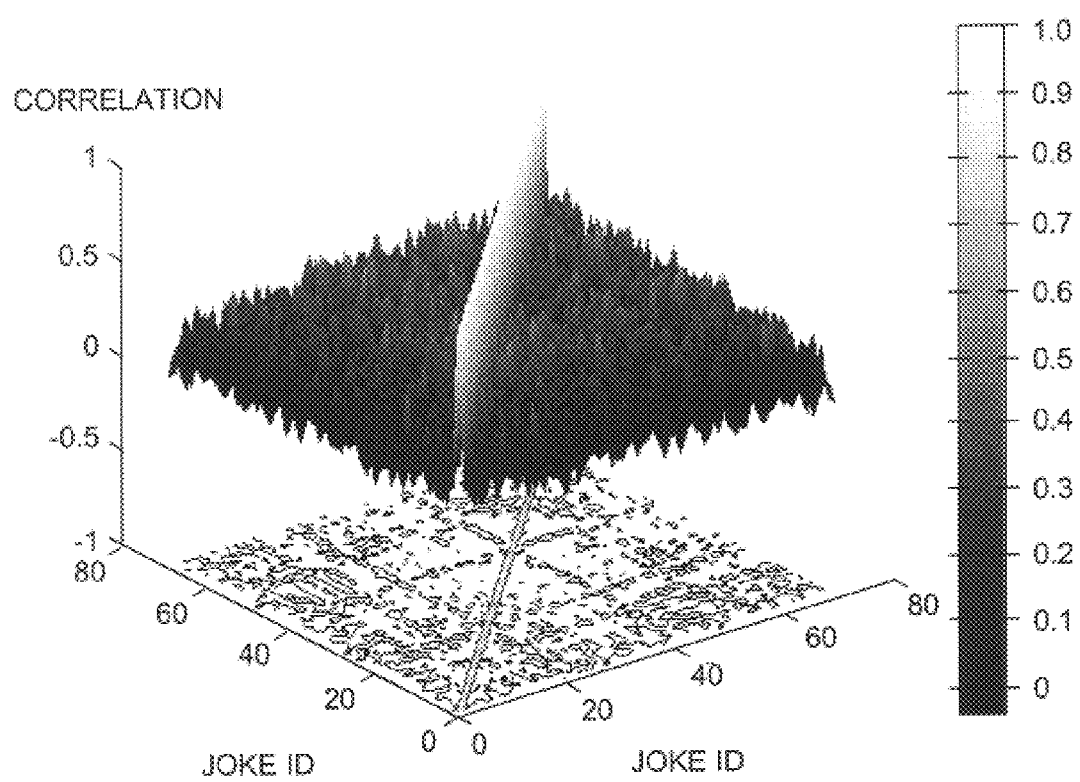
FIG. 3 illustrates preference correlation data obtained in accordance with an embodiment of the invention.

The global correlation matrix is the normalized sum of the individual covariance matrices Si of each user, which is a matrix with each element ranging from [−1, +1] and the diagonal elements as 1. The plot of correlations between all the jokes is given in FIG. 3. Each point on the plotted surface corresponds to a correlation between a pair of jokes. Every peak indicates a certain degree of positive or negative correlation between that pair of jokes. The diagonal running across the surface indicates the correlation of a joke with itself and is thus +1. The contours of the surface plot on the X-Y plane show the distribution of peaks and planar regions in the plot.

Attention now turns to the principal component analysis, as implemented with the executable instructions of the PCA module 74. The data collected over the entire set of jokes is multi-dimensional. One attempts to find clusters in a reduced space by using the principal components of the Eigen vectors of the sub matrix $C_p$ of C consisting of only the correlations between the jokes in the predictor set. $C_p$ can be represented in terms of Eigen components as:

$$C_p = U_T \Lambda U$$

where U is the matrix of Eigen vectors of C and $\Lambda$ is the diagonal matrix of Eigen values of C.

The ratings of the predictor set for each user are projected along the principal Eigen vectors $U_1$ and $U_2$ to obtain a two dimensional representation of the ratings.

This maps each user onto a lower-dimensional Eigen joke space, spanned by the principal components of $C_p$.

Figure 4:
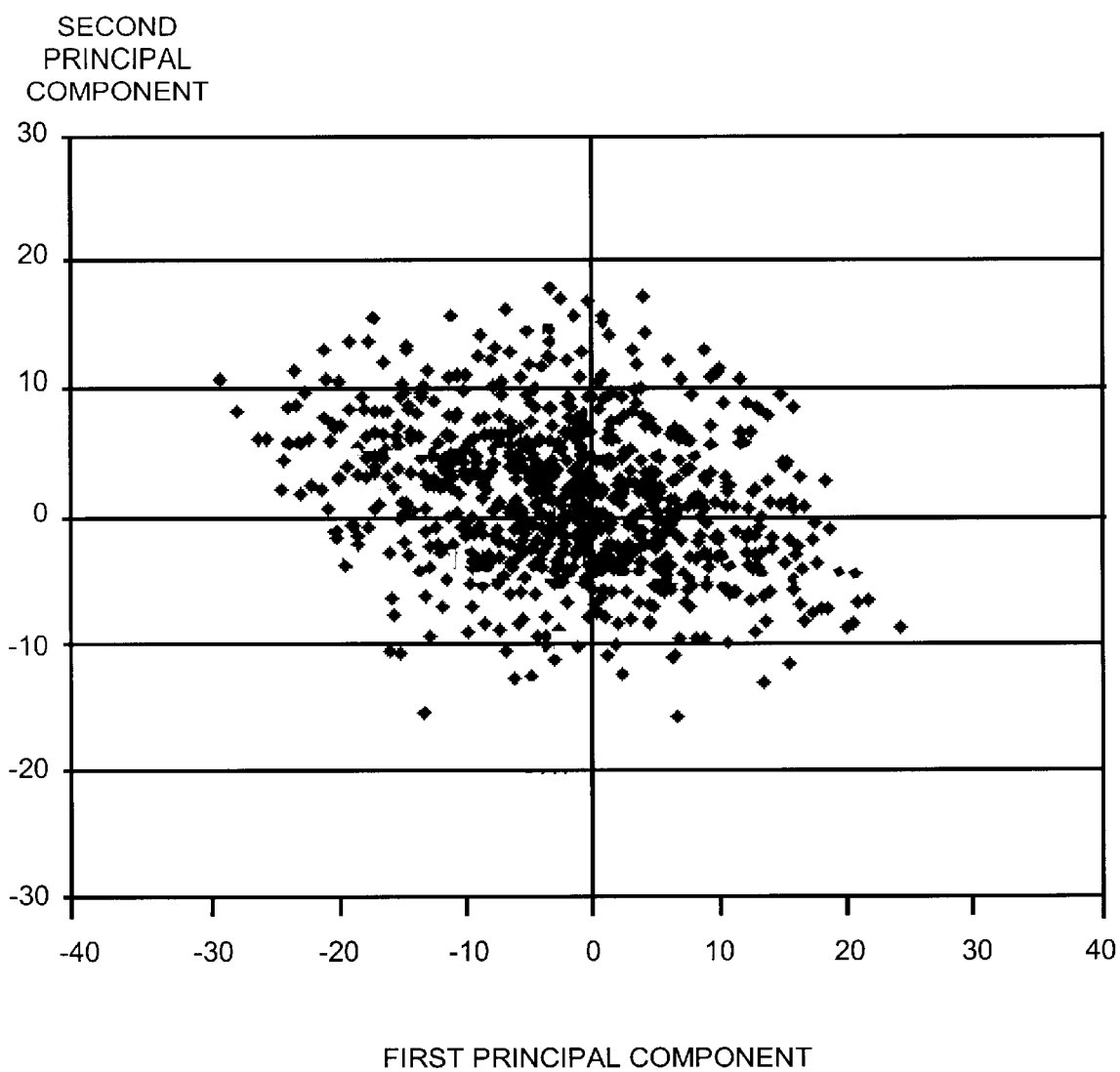
FIG. 4 illustrates two-dimensional data projected along principal components in accordance with an embodiment of the invention.

FIG. 4 shows the plot of the lower-dimensional projection of the ratings of $J_P$ for 7136 users. Each user is thus represented by a point in this Eigen space based on his/her ratings in the predictor set.

Figure 5:
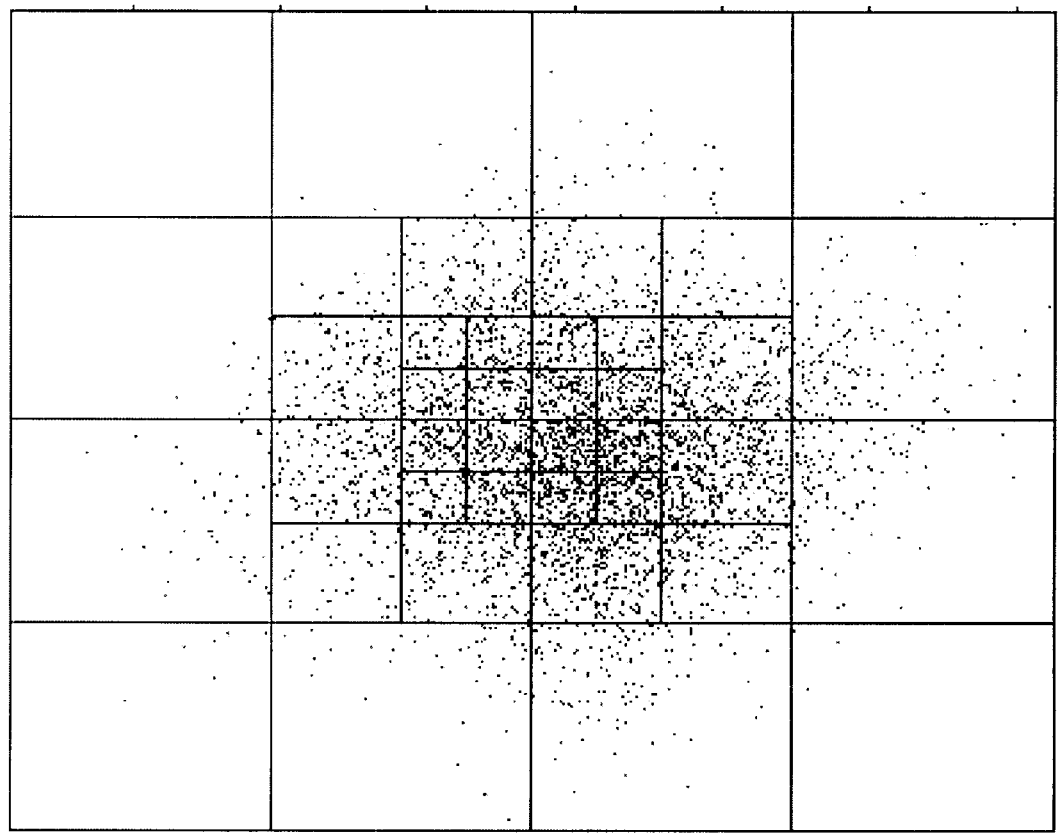
FIG. 5 illustrates two-dimensional rectangular clustering implemented in accordance with an embodiment of the invention.

The clustering module 80 is then invoked to process the lower-dimensional data. One example of clustering performed by the clustering module can be characterized as follows:

1. Consider the minimal square cell centered around the origin of the Eigen plane, which encloses all the points (user projections) in the plane. This forms the outermost level hierarchical subdivision.
2. Bisect the cell along the x and y axes to yield four sub cells. These are considered to be at the next "level" in the hierarchy.
3. For each new sub cell that has the origin as one of its vertices, perform the operation in step 2 to generate sub cells at the next hierarchical level. This results in data of the type shown in FIG. 5.
4. Repeat Step 3 for each level until a total depth of 6 levels giving 64 square cells is reached. Each cell is now a cluster and encapsulates a group of users close to each other in the Eigen place.
5. The main joke ratings within each cluster when sorted by rank will reflect the joke preferences of the users in that cluster. These ratings can then be substituted by the indices of the jokes they represent to give vectors of jokes ranked in decreasing order of preferences within a cluster of users.
6. The aggregation of these joke index vectors of each cluster will give the prediction matrix or recommendation map 82.

At this point, the recommendation module 88 can now operate. The recommendation module 88 includes executable instructions to perform the following tasks.

1. Get ratings for the predictor set for the user.
2. Project them onto the Eigen plane.
3. Find the representative cluster Z.
4. Recommend the highest preference jokes from the $Z_{th}$ row of the recommendation map 82.

The clusters and the prediction matrix are periodically regenerated to adaptively evolve a better prediction basis each time.

The technique is based purely on statistical correlation and uses no semantic information about the jokes. An aspect of the invention is directed toward the notion of a predictor set and provides a hypothesis on how best to choose such a set for most effective predictions. As such, the technique should be applicable to any on-line recommender system based on an object domain which can be rated on-line.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method to recommend items to at least one user based upon data collected from N users where N>>1, the method executed by a computer under control of a program, the computer including a memory storing the program, the method comprising the following steps:

(a) during an initial on-line phase, accumulating a database of preference patterns based upon input from N users, during which phase no recommendations are made;

(b) during an initial off-line phase, processing the database accumulated at step (a) to identify a predictor set of items for all future users to rate and to transform high-dimensional preference patterns to lower-dimensional data, and converting said lower-dimensional data into a recommendation map;

(c) during a second on-line phase:
 (i) collecting high-dimensional preference data for said new user; and
 (ii) generating recommendations for said new user based on data collected in step (c)(i) and based upon said recommendation map derived in one of step (b)

and step (d); wherein time-consuming processing steps associated with step (b) and step (d) are avoided and effective magnitude of N is reduced; and (d) during subsequent off-line phases:
processing said database of preference patterns based upon input from more than N users accumulated from step (a) and step (c)(i);
transforming high-dimensional preference patterns to lower-dimensional data; and
converting said lower-dimensional data into a recommendation map.

2. The method of claim 1, where step (a) includes collecting high-dimensional preference data on many items from a set of users.

3. The method of claim 1, wherein step (b) includes:
coordinating preference information for a selected user; and
mapping said preference information to said recommendation map.

4. The method of claim 3, further comprising the steps of:
routing chosen content from a set of deliverable content to said selected user in response to said mapping step.

5. The method of claim 1, wherein step (a) includes:
(i) delivering selective content to users; and
(ii) recording responses of users receiving said selective content to form said preference data.

6. The method of claim 5, wherein step (a)(i) includes delivering said selective content to users through an interactive graphical user interface.

7. The method of claim 5, wherein step (a)(ii) includes recording fine-grained responses of said users receiving said selective content specified through a fine-grained rating menu.

8. The method of claim 1, wherein step (a) includes accumulating a dense matrix of preference data for said set of individuals based on dividing objects to be rated into a predictor set and a recommendation set.

9. The method of claim 8, wherein step (a) includes selecting objects having high variance in their preference values for said prediction set.

10. The method of claim 1, wherein step (a) is performed interactively during said on-line phase.

11. The method of claim 4, wherein said mapping and routing steps are performed in an on-line phase.

12. The method of claim 1, wherein step (b) is performed in an off-line phase.

13. The method of claim 1, wherein, step (b) includes clustering said lower-dimensional data to form said recommendation map.

14. A computer readable memory storing a routine that upon execution directs a computer to function so as to recommend items to at least one user based upon data collected from N users where N>>1, the routine upon execution carrying out the following steps:

(a) during an initial on-line phase, accumulating a database of preference patterns based upon input from N users, during which phase no recommendations are made;

(b) during an initial off-line phase, processing the database accumulated at step (a) to identify a predictor set of items for all future users to rate and to transform high-dimensional preference patterns to lower-dimensional data, and converting said lower-dimensional data into a recommendation map;

(c) during a second on-line phase:
(i) collecting high-dimensional preference data for said new user; and
(ii) generating recommendations for said new user based on data collected in step (c)(i) and based upon said recommendation map derived in one of step (b) and step (d); wherein time-consuming processing steps associated with step (b) and step (d) are avoided and effective magnitude of N is reduced; and (d) during subsequent off-line phases:
processing said database of preference patterns based upon input from more than N users accumulated from step (a) and step (c)(i);
transforming high-dimensional preference patterns to lower-dimensional data; and
converting said lower-dimensional data into a recommendation map.

15. The computer readable memory of claim 14, further comprising a recommendation module to coordinate preference information for a selected individual and map said preference information to said recommendation map.

16. The computer readable memory of claim 15, further comprising a content delivery module to route said selected individual chosen content from a set of deliverable content.

17. The computer readable memory of claim 14, wherein said preference accumulation module includes executable instructions to deliver selective content to individuals, and instructions to record responses of said individuals to said selective content to form said preference data.

18. The computer readable memory of claim 14, wherein said preference accumulation module includes executable instructions to deliver a Hypertext Markup Language (HTML) page to individuals.

19. The computer readable memory of claim 18, wherein said HTML page includes an image map forming a fine-grained rating menu.

20. The computer readable memory of claim 14, wherein said preference accumulation module includes executable instructions to accumulate a dense matrix of preference data for said set of individuals.

21. The computer readable memory of claim 14, wherein said preference accumulation module includes executable instructions to select predictor set objects with high variance in preference values.

* * * * *